(12) United States Patent
Whale et al.

(10) Patent No.: US 7,805,910 B2
(45) Date of Patent: Oct. 5, 2010

(54) FIXING DEVICE AND METHOD

(75) Inventors: Luke Richard John Whale, Eastleigh (GB); Douglas Wilson Cullen, Kirkaldy (GB)

(73) Assignee: Illinois Tool Works Inc, Glenview, IL (US)

( * ) Notice: Subject to any disclaimer, the term of this patent is extended or adjusted under 35 U.S.C. 154(b) by 1156 days.

(21) Appl. No.: 11/060,587

(22) Filed: Feb. 18, 2005

(65) Prior Publication Data

US 2005/0224667 A1 Oct. 13, 2005

(30) Foreign Application Priority Data

Feb. 19, 2004 (GB) .................................. 0403712.3

(51) Int. Cl.
*E04C 3/00* (2006.01)
(52) U.S. Cl. .......................... 52/837; 52/838; 52/655.1; 52/712; 52/696; 52/584.1; 52/665; 52/643; 52/841; 52/842; 52/848; 403/292; 403/293; 403/335; 403/336; 248/200.1
(58) Field of Classification Search .................. 52/837, 52/838, 655.1, 712, 696, 584.1, 665, 643, 52/841, 842, 848; 403/292, 293, 335, 336; 248/200.1
See application file for complete search history.

(56) References Cited

U.S. PATENT DOCUMENTS

| 184,521 | A | * | 11/1876 | Hammond | 52/838 |
|---|---|---|---|---|---|
| 542,283 | A | * | 7/1895 | Rosseau | 52/838 |
| 2,605,867 | A | * | 8/1952 | Goodwin | 52/364 |
| 3,119,635 | A | * | 1/1964 | Dealy et. al. | 403/334 |
| 3,442,542 | A | * | 5/1969 | Watanabe | 403/300 |
| 3,555,755 | A | * | 1/1971 | Reed | 52/308 |
| 3,960,458 | A | * | 6/1976 | Sato et al. | 403/189 |
| 4,021,991 | A | * | 5/1977 | Hotz | 403/388 |
| 4,074,947 | A | * | 2/1978 | Matake et al. | 403/231 |
| 4,220,419 | A | * | 9/1980 | Hawes | 403/189 |
| 4,246,736 | A | * | 1/1981 | Kovar et al. | 52/696 |
| 4,251,973 | A | * | 2/1981 | Paik | 52/837 |
| 5,209,444 | A | * | 5/1993 | Rinderer | 248/205.1 |
| 5,678,799 | A | * | 10/1997 | Jorgensen et al. | 248/343 |
| 5,884,448 | A | * | 3/1999 | Pellock | 52/643 |
| 5,899,042 | A | * | 5/1999 | Pellock | 52/696 |
| 5,930,966 | A | * | 8/1999 | Wood et al. | 52/364 |
| 6,073,405 | A | * | 6/2000 | Kasai et al. | 52/283 |
| 6,076,788 | A | * | 6/2000 | Akiyama | 248/200.1 |
| 6,354,055 | B1 | * | 3/2002 | Shaw et al. | 52/712 |
| 6,520,705 | B2 | * | 2/2003 | Stasney, Jr. | 403/258 |

(Continued)

*Primary Examiner*—Richard E Chilcot, Jr.
*Assistant Examiner*—Mark R Wendell
(74) *Attorney, Agent, or Firm*—Levenfeld Pearlstein, LLC

(57) ABSTRACT

A device 60 for fixing together first and second side-by-side beams of a kind having first and second spaced apart flanges connected by a web. The device 60 comprises a member 62 having first and second opposing ends 64, 66 and is configured to extend from a first flange to a second flange of the beams. The device further comprises at least one portion 68, 70 extending laterally of each of said first and second opposing ends with the at least one portion at the first opposing end being configured to be fixed to an outer surface of the first flange of the first beam and the at least one portion at the second opposing end being configured to be fixed to an outer surface of the second flange of the second beam.

31 Claims, 6 Drawing Sheets

U.S. PATENT DOCUMENTS

| | | | |
|---|---|---|---|
| 6,754,992 B1 * | 6/2004 | Byfield et al. | 52/36.5 |
| 6,768,071 B1 * | 7/2004 | Gretz | 200/297 |
| 6,988,346 B2 * | 1/2006 | Shamroukh et al. | 52/693 |
| 6,993,882 B2 * | 2/2006 | Crawford et al. | 52/696 |
| 7,040,586 B2 * | 5/2006 | Kusber et al. | 248/200.1 |
| 7,213,377 B1 * | 5/2007 | Sackett | 52/696 |
| 2007/0256389 A1 * | 11/2007 | Davis | 52/729.4 |

* cited by examiner

FIXING DEVICE AND METHOD

The present invention relates to a device for fixing together first and second side-by-side beams, a structural unit comprising first and second side-by-side beams fixed together with such a device, and a method of fixing together first and second side-by-side beams using such a device.

It is known within the construction industry to use prefabricated wooden I-beams or metal webbed beams as a replacement for, traditional solid timber beams. Such wooden I-beams and metal webbed beams are becoming increasingly popular in domestic house construction to form floor joists, roof beams, purlins, lintels and the like. Both the wooden I-beam and the metal webbed beam comprise a wooden upper flange member spaced apart from a wooden lower flange member. FIG. 1a shows a wooden I-beam 10 and FIG. 1b shows a metal webbed beam 20. In the case of the wooden I-beam, a central web member 12 is glued centrally between these lower 14 and upper 16 flanges into pre-cut grooves. The metal webbed beam provides an alternative to the wooden I-beam according to which the upper 24 and lower 26 flange members are connected to each other by means of one or more metal web members 22 that are spaced apart along each side of the flanges 24, 26. The metal web members are fixed to the sides of the flanges by means, for example, of pre-punched nails or tines.

Where loads are high, the I-beams or metal webbed beams are connected together in a two or three ply manner to form a compound unit in which the connected I-beams or metal webbed beams act as a single structural emit. However, connecting the I-beams or metal webbed beams together can be difficult because the upper and lower flange members are comparatively small. More specifically, the upper and lower flange members of adjacent I-beams or metal webbed beams present surface areas that are normally insufficient to allow enough structural connections to be made to transfer loads from one I-beam or metal webbed beam to another.

FIG. 2a shows a known compound unit 30 formed of I-beams 32 connected together in a 3-ply manner. The above stated problem is addressed by the use of so-called 'filler blocks' 34 which are fitted between the webs 36 of adjacent beams 32 to form a solid section in the middle of the compound unit. The filler blocks provide a solid section into or through which bolts, nails or screws 38 may be fixed to make an effective connection between the I-beams. Thus, the filler blocks can enable the I-beams to act as a single structural unit.

FIG. 2b shows a known compound unit 40 formed of metal-webbed beams 42 connected together in a 2-ply manner. The above stated problem is addressed by positioning solid timber fillers 44 between the webs (not shown) of the metal webbed beams 42 and by fixing sheets of plywood 48 to the outside faces of the metal webbed beams. The timber fillers 44 and the plywood sheets 48 form a solid section that is typically fixed together by means of one or more bolts 50. Thus, the metal webbed beams can act as a single structural unit.

The present applicant has appreciated that both of the above known approaches to the problem have their shortcomings. Filler blocks 34 and timber fillers 44 are time consuming and awkward to fit. In addition, it can be difficult to see if they have been fitted properly or indeed if they have been fitted at all when the 2 or 3-ply unit is in situ. Furthermore, the filler blocks and timber fillers must be cut or planed to an exact width so that they fit properly between the webs of the I-beams or metal webbed beams. The filler blocks must be of the correct height and they need to be of low moisture content or a material with low shrinkage characteristics to stop gaps from appearing when they dry out in use. These known approaches also require many fixings (e.g. nails or bolts) to transfer loads effectively from one I-beam or metal webbed beam to another and the fixing types and patterns often have to be designed to suit individual applications.

In summary, known use of I-beams and metal webbed beams to create compound units for high load bearing applications can be costly and error-prone. Correct construction of the compound units usually requires a considerable amount of skilled labour. Also, the compound units can be heavy and difficult to handle.

In view of the above shortcomings, the present applicant has devised the present invention. Therefore, in accordance with a first aspect of the invention there is provided a device for fixing together first and second side-by-side beams, each of the first and second beams having first and second spaced apart flanges connected by a web, the device comprising a member having first and second opposing ends, and configured to extend from a first flange to a second flange of the beams, at least one portion extending laterally of each of said first and second opposing ends, the at least one portion at the first opposing end being configured to be fixed to an outer surface of the first flange of the first beam, the at least one portion at the second opposing end being configured to be fixed to an outer surface of the second flange of the second beam.

The device may be brought into use, for example, by fixing the at least one portion at the first opposing end to an outer surface of the first flange of the first beam. The second beam may then be moved so as to be side-by-side with the first beam and the at least one portion at the second opposing end fixed to an outer surface of the second flange of the second beam. Thus, the device can be used to fix the side-by-side beams together so that they can act as a single structural unit.

A device according to the invention can provide for ease and speed of use. Notably, the need to cut and plane filler blocks to size can be avoided. Also, in contrast with the known filler block approach the device can be readily identified as being fitted when a compound unit comprising side-by-side beams is in use.

More specifically, the at least one portion at the first opposing end may be configured to be fixed to an outer surface of the first flange of both first and second beams, and the at least one portion at the second opposing end may be configured to be fixed to an outer surface of the second flange of both first and second beams.

The at least one portion(s) may be configured to be fixed to the outer surfaces of the first and second flanges of both first and second beams where the outer surfaces of adjacent first flanges of the first and second beams face in a substantially opposite direction to the outer surfaces of adjacent second flanges of the first and second beams.

The member may be configured to be positioned between the first and second side-by-side beams and the at least one portion at each end of the member may comprise a first part and at least one second part, the first part and the at least one second part extending in opposing directions. Thus, for example, the first part at the first opposing end may be fixed to an outer surface of the first flange of the first beam and the at least one second part at the first opposing end may be fixed to an outer surface of the first flange of the second beam. Also, the first part at the second opposing end may be fixed to an outer surface of the second flange of the first beam and the at least one second part at the second opposing end may be fixed to an outer surface of the second flange of the second beam.

More specifically, the member may be configured such that, when the device is in use, the first and second side-by-side beams are in close proximity to each other.

Alternatively or in addition, the first part may extend substantially further than the at least one second part.

Alternatively or in addition, the first part at the first end of the member may extend in an opposite direction to the first part at the second end of the member. Thus, where the first part extends substantially further than the at least one second part at both ends of the member, the device may be oriented either way round and the device may provide the same resistance to shear between the two beams irrespective of its orientation.

Alternatively or in addition, the at least one second part may comprise two spaced apart limbs. The limbs may be spaced apart in a direction substantially perpendicular to the direction that the two limbs extend.

The at least one portion may be configured for fixing to the flanges by means of at least one aperture for receiving fixing means, such as a nail or screw.

The member may comprise at least one section extending laterally of the member along at least part of its length.

More specifically, the at least one section may extend from a periphery of the member.

Alternatively or in addition, the at least one section may be integrally formed with the member.

Alternatively or in addition, the member may comprise first and second sections, the first and second sections extending laterally of the member in opposite directions. Thus, the device can, in use, be oriented either way round and provide the same shear resistance between the beams.

More specifically, where the at least one portion at each end of the member comprises a first part and at least one second part with the first part and the at least one second part extending in opposing directions, the first section may extend in a direction substantially in-line with the first part and the second section may extend in a direction substantially in-line with the at least one second part.

Alternatively or in addition, the at least one portion and the at least one section may be configured to sandwich an edge of a flange of a beam between them. Thus, the at least one section may assist in transferring shear forces from one beam to another.

More specifically, the at least one portion and the at least one section may be configured to accommodate flanges of different thicknesses. More specifically, the at least one section may present a slanted surface to a flange, such that a separation between the at least one section and the at least one portion decreases in a direction towards the member. Thus, the at least one section and the at least one portion may engage tightly with the flange. The slanted surface of the at least one section may allow the load bearing and transferring properties of the device to come into play as soon as the device is brought into engagement with a beam.

Alternatively or in addition, an edge of the at least one section presented to a flange may be configured to intermesh with the flange.

More specifically, the edge of the at least one section may be configured to cut into the flange.

The device may be configured to be of a predetermined load bearing capacity. Thus, prior to use the load bearing capacity of a side-by-side beam arrangement may be determined and a plurality of devices used in accordance with this determination should the load bearing capacity of one device be insufficient. In use, the plurality of devices may be spaced apart along the side-by-side beam arrangement.

The device may be substantially formed of a metal, such as steel.

The at least one portion may be integrally formed with the member.

More specifically, the at least one portion and the member may be formed from a single sheet of material.

More specifically, where the member comprises at least one section, the member, the at least one section and the at least one portion may be formed from a single sheet of material.

Forming one or more components integrally with the member from a single sheet of material may provide for a reduction in material and/or manufacturing cost.

Alternatively, the at least one portion may be fixed to the member by means of welding or the like.

The first and second beams may be I-beams, metal webbed beams or the like.

According to a second aspect of the present invention, there is provided a structural unit comprising at least two side-by-side beams, in which adjacent beams are fixed together with a device according to the first aspect of the present invention.

Forms of the second aspect of the present invention may comprise one or more features described above in relation to the first aspect of the invention.

According to a third aspect of the present invention, there is provided a method of fixing together first and second side-by-side beams, each of the first and second beams having first and second spaced apart flanges connected by a web, the method comprising positioning a member having first and second opposing ends and at least one portion extending laterally of each of said ends such that the member extends from a first flange to a second flange of the beams, fixing the at least one portion at the first opposing end to an outer surface of the first flange of the first beam, and fixing the at least one portion at the second opposing end to an outer surface of the second flange of the second beam.

Forms of the third aspect of the invention may comprise one or more of the features described above in relation to the first and second aspects of the invention.

A specific embodiment of the present invention will now be described by way of example only and with reference to the following drawings, in which:

FIG. 2a shows a known compound unit formed from the I-beam of FIG. 1a;

Figure 3:
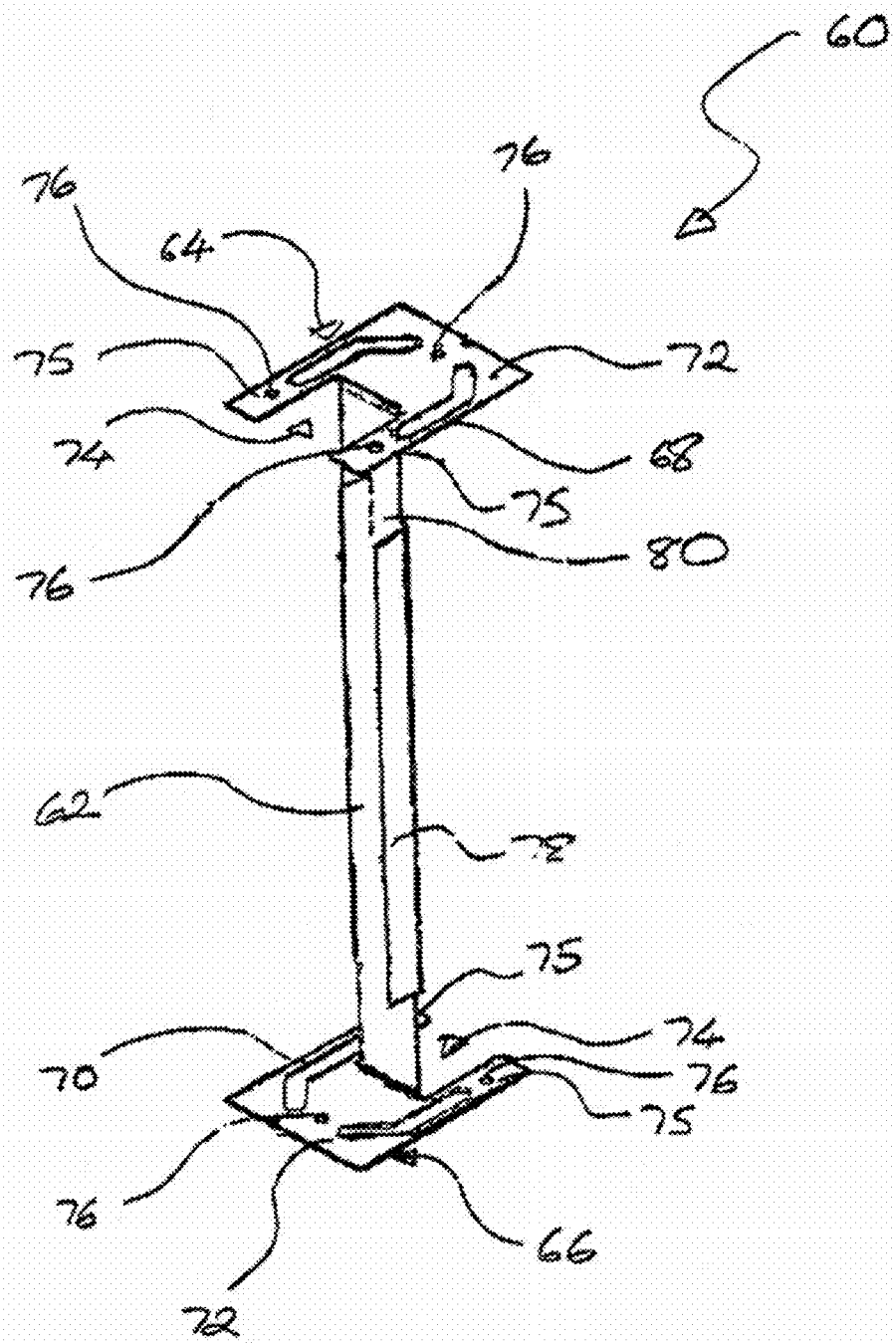
FIG. 3 shows a device according to the present invention.

As shown in FIG. 3, the device 60 comprises a member 62 having first 64 and second 66 spaced apart ends. A portion 68, 70 extends laterally of each of the first and second ends. The portions 68, 70 each comprise a first part 72 and a second part 74 which extend in opposing directions. As can be seen from FIG. 3, the first parts 72 extend substantially further than the second parts 74. Also, the first part 72 at the first end 64 extends in an opposite direction to the first part 72 at the second end 66. Each second part 74 comprises two spaced apart limbs 75 which are spaced apart from each other in a direction substantially perpendicular to the direction that they extend. The first 72 and second 74 parts are provided with apertures 76 for receiving fixing means, such as nails or screws.

First 78 and second 80 sections extend laterally of the periphery of the member 62 along a substantial part of its length. The first and second sections 78, 80 extend from opposite peripheral edges of the member 62 and in opposite directions to each other. As can be seen from FIG. 3, the first section 78 extends in a direction substantially in-line with the first part 72 of the second end 66 and the second section 80 extends in a direction substantially in-line with the first part 72 of the first end 64.

Figure 4A:
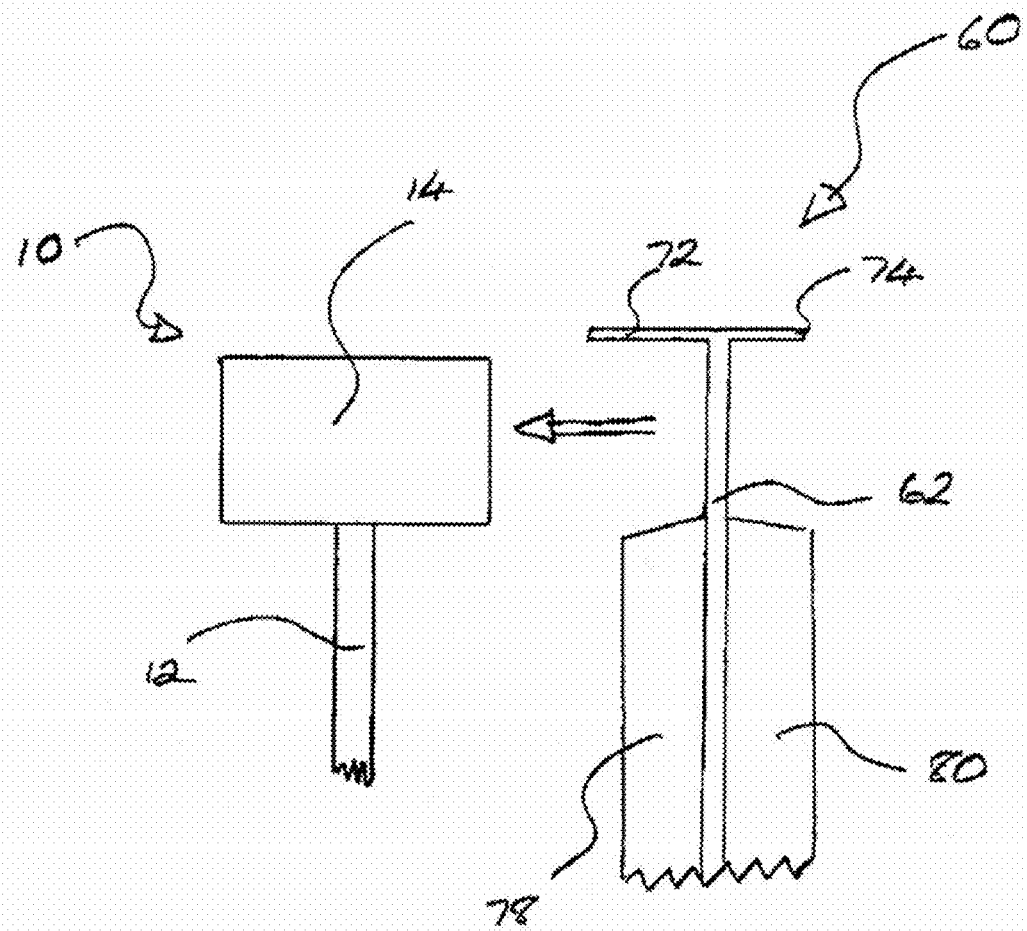
FIG. 4a shows part of the device of FIG. 3 in detail, when in use.

Referring to FIG. 4a, which shows the device 60 of FIG. 3 in use with an I-beam 10, the first and second sections 78, 80 present a slanted surface to a flange, such that a separation between the section and its respective part 2, 74 decreases in a direction toward the member 62.

Figure 1A:
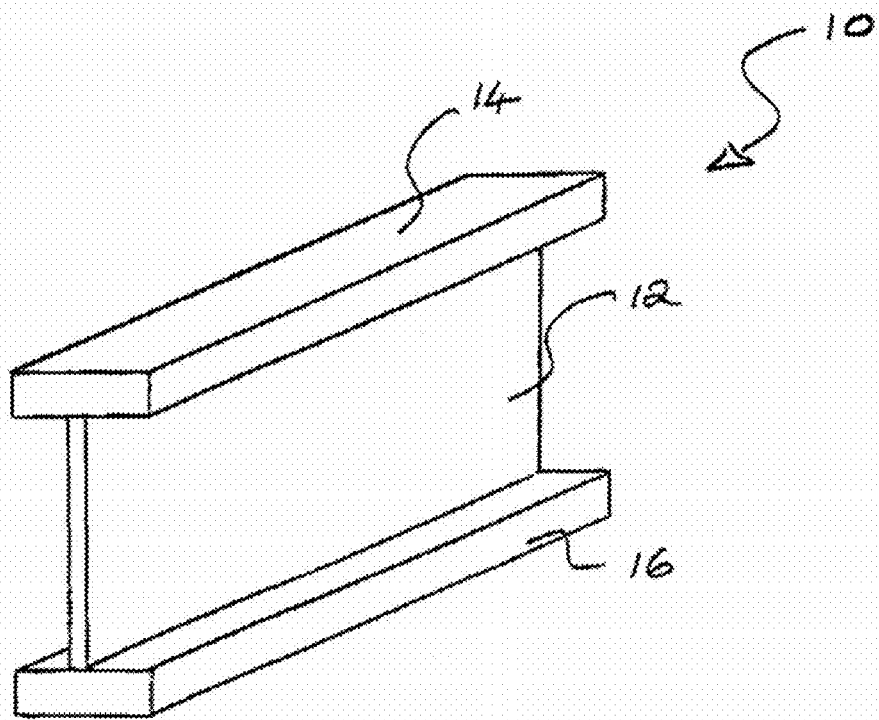
FIG. 1a shows a known wooden I-beam.
Figure 1B:
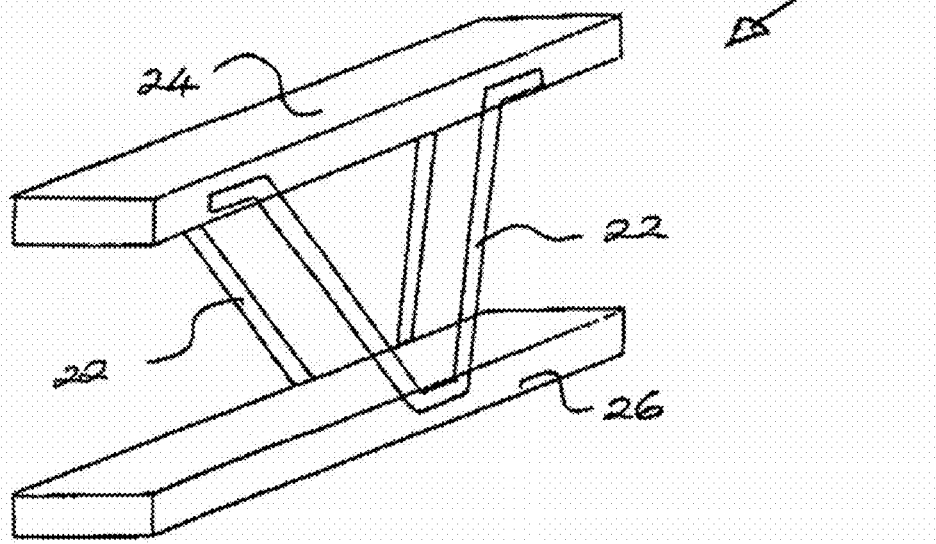
FIG. 1b shows a known metal webbed beam.
Figure 2A:
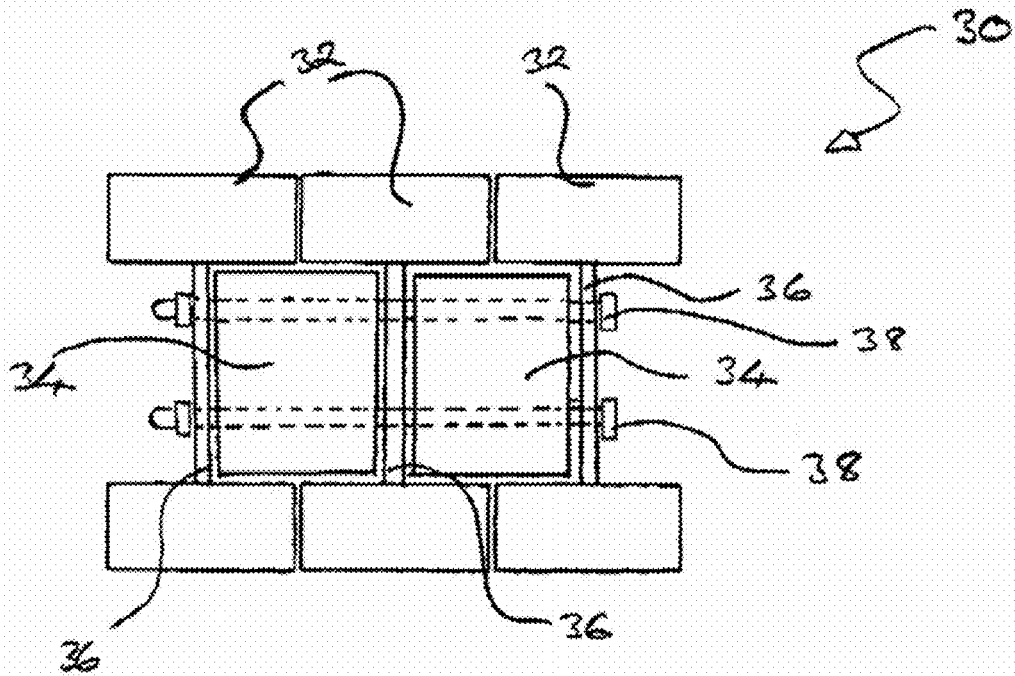
Figure 2B:
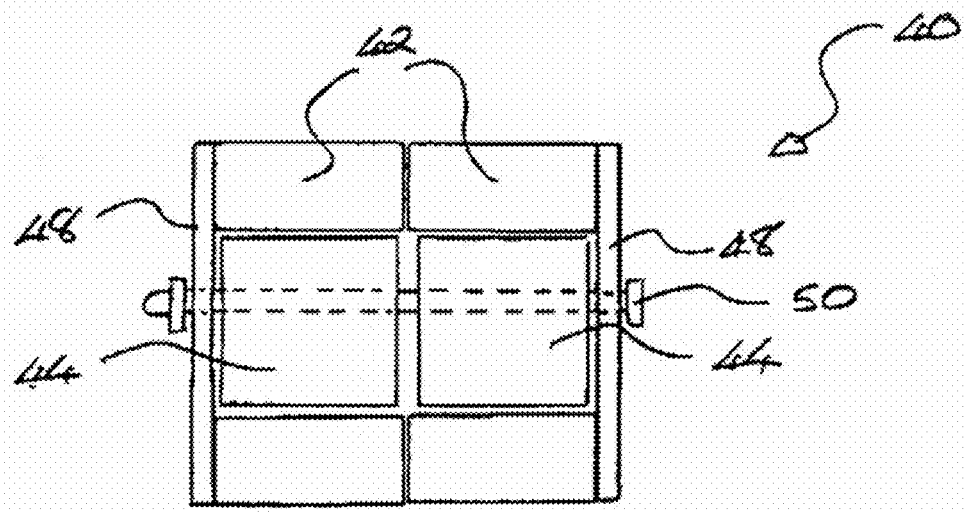
FIG. 2b shows a known compound unit formed from the metal webbed beam of FIG. 1b.

The device is typically formed of a metal, such as steel. The first and second sections 78, 80 and the portions 68, 70 at each end of the member are formed integrally with the member 62 from a single sheet of metal. Referring to FIG. 5, a single sheet of metal 110 is cut as a first step towards forming the first and second sections 78, 80 and the portions 68, 70. Then the cut sheet of metal 110 is folded to form each of these components. Use of the device of FIG. 3 is illustrated with reference to FIG. 4b, which shows the device in use with two side-by-side I-beams 90, 92. It should be appreciated that the device of FIG. 3 can be used in the same fashion and as readily with side-by-side metal webbed beams of the kind shown in FIG. 1b.

Figure 4B:
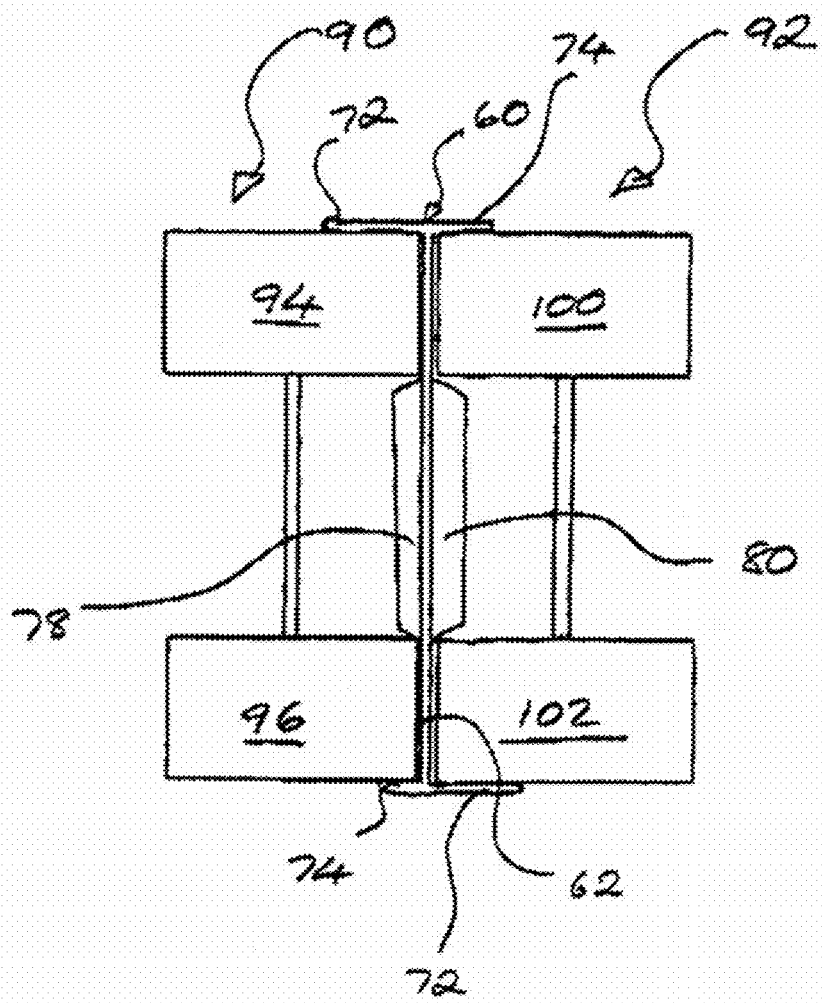
FIG. 4b shows the device of FIG. 3 in use.
Figure 5:
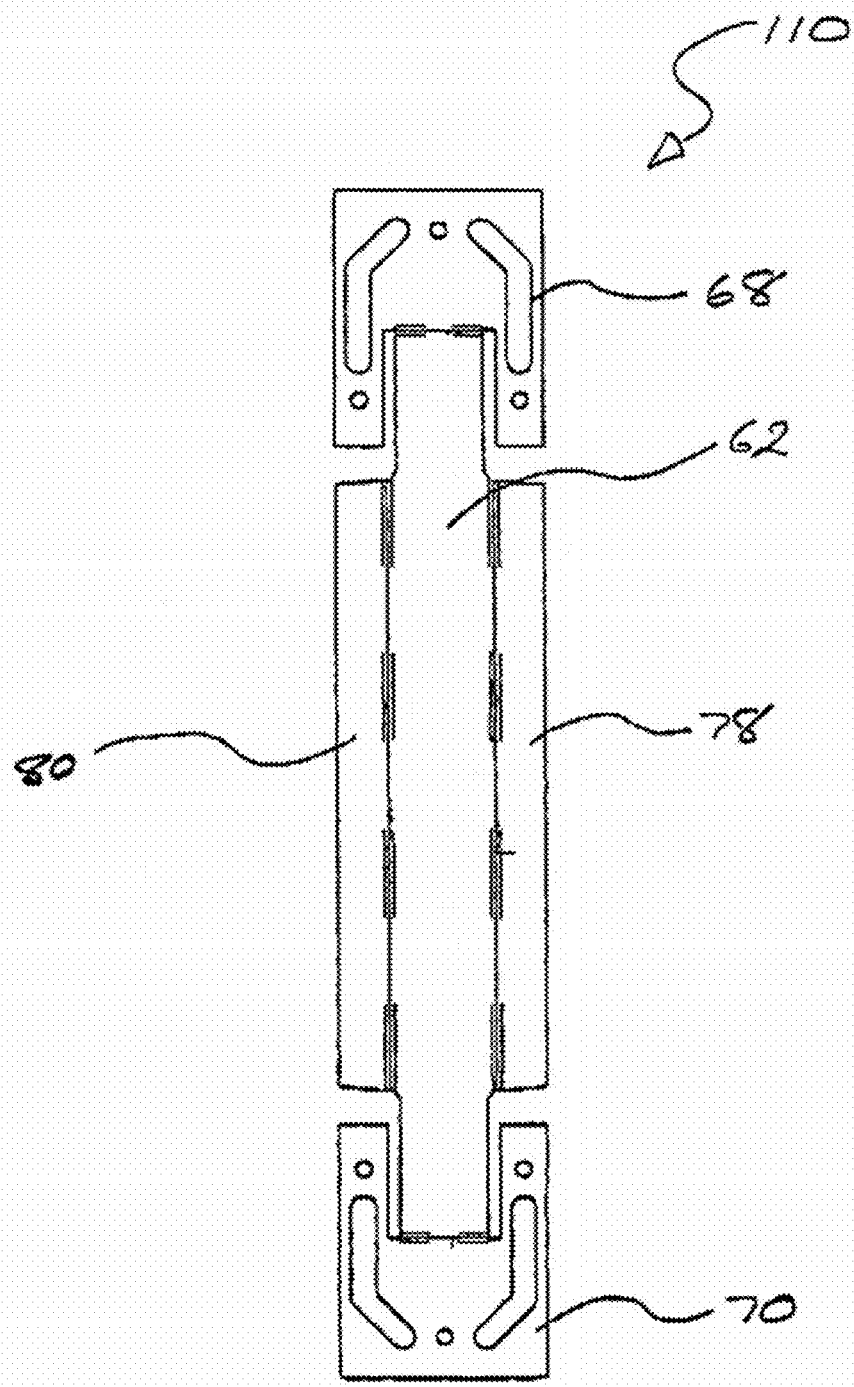
FIG. 5 shows a single sheet of material cut to form the device of FIG. 3.

Referring to FIGS. 4a and 4b, the device 60 is brought into use by sliding the first 94 and second 96 flanges of the first beam respectively between the first section 78 and the first part 72 and between the first section 78 and the second part 74. Then, the first part 72 is fixed to an outer surface of the first flange 94 of the first beam 90 and the second part 74 at the opposing end of the member 62 is fixed to an outer surface of the second flange 96 of the first beam by driving nails through the apertures 76 provided in the first and second parts.

The second beam 92 is then moved so as to be side-by-side with the first beam 90 and is brought into engagement with the device in the same manner as described above with reference to the first beam. Thus, the second part 74 at one end of the member 62 is fixed to an outer surface of the first flange 100 of the second beam 92 and the first part 72 at the other end of the member is fixed to an outer surface of the second flange 102 of the second beam 92 by driving nails through the apertures 76 provided in the first and second parts.

The device 60 has a predetermined load bearing capacity which depends on its construction and its material composition. Where a load bearing capacity is required that exceeds that of an individual device, two or more devices may be used. In such an application, the two or more devices are spaced apart along the length of the side-by-side beams.

It is to be appreciated that application of the device of the present invention is not merely limited to the fixing of two side-by-side beams but finds application in three, or perhaps even more beams arranged side-by-side. In such applications, one or more devices according to the invention are positioned between adjacent beams to fix the adjacent beams together and to transfer loads from one adjacent beam to the other.

The invention of claimed is:

1. A device for fixing together first and second side-by-side beams, each of the first and second beams having coplanar spaced apart first flanges and coplanar spaced apart second flanges, each of the first and second flanges connected by a web, the device comprising:

a unitary member having a Z-shaped cross-section and first and second opposing ends, and configured to extend from a first flange of the first beam to a second flange of the second beam and configured to transfer a load across the webs of the first and second beams in a shear direction, at least one portion extending laterally from each of said first and second opposing ends, the at least one portion at the first opposing end being configured to be fixed to an outer surface of the first flange of the first beam, the at least one portion at the second opposing end being configured to be fastened with a fastener to an outer surface of the second flange of the second beam.

2. A device according to claim 1, in which the at least one portion at the first opposing end is configured to be fixed to an outer surface of the first flange of both first and second beams, and the at least one portion at the second opposing end is configured to be fixed to an outer surface of the second flange of both first and second beams.

3. A device according to claim 1, in which the at least one portion is configured to be fixed to the outer surfaces of the first and second flanges of both first and second beams where the outer surfaces of adjacent first flanges of the first and second beams face in a substantially opposite direction to the outer surfaces of adjacent second flanges of the first and second beams.

4. A device according to claim 1, in which the member is configured to be positioned between the first and second side-by-side beams and the at least one portion at each end of the member comprises a first part and at least one second part, the first part and the at least one second part extending in opposing directions.

5. A device according to claim 4, in which the member is configured such that, when the device is in use, the first and second side-by-side beams are adjacent to each other, with the device positioned between the first and second side-by-side beams.

6. A device according to claim 4, in which the first part extends substantially further than the at least one second part.

7. A device according to claim 4, in which the first part at the first end of the member extends in an opposite direction to the first part at the second end of the member.

8. A device according to claim 4, in which the at least one second part comprises two spaced apart limbs.

9. A device according to claim 8, in which the limbs are spaced apart in a direction substantially perpendicular to the direction that the two limbs extend.

10. A device according to claim 1, in which the at least one portion is configured for fixing to the flanges by means of at least one aperture for receiving fixing means.

11. A device according to claim 1, in which the member comprises at least one section extending laterally from the member along at least part of its length.

12. A device according to claim 11, in which the at least one section extends from a periphery of the member.

13. A device according to claim 11, in which the at least one section is integrally formed with the member.

14. A device according to claim 11, in which the member comprises first and second sections, the first and second sections extending laterally from the member in opposing directions.

15. A device according to claim 14, in which, the at least one portion at each end of the member comprises a first part and at least one second part with the first part and the at least one second part extending in opposing directions, the first section extends in a direction substantially in-line with the first part and the second section extends in a direction substantially in-line with the at least one second part.

16. A device according to claim 11, in which the at least one portion and the at least one section are configured to sandwich an edge of a flange of a beam between them.

17. A device according to claim 16, in which the at least one portion and the at least one section are configured to accommodate flanges of different thicknesses.

18. A device according to claim 17, in which the at least one section presents a slanted surface to a flange, such that a separation between the at least one section and the at least one portion decreases in a direction towards the member.

19. A device according to claim 16, in which an edge of the at least one section presented to a flange is configured to intermesh with the flange.

20. A device according to claim 19, in which the edge of the at least one section is configured to cut into the flange.

21. A device according to claim 1, in which the device is configured to be of a predetermined load bearing capacity.

22. A device according to claim 1, in which the device is substantially formed of a metal.

23. A device according to claim 1, in which the at least one portion is integrally formed with the member.

24. A device according to claim 23, in which the at least one portion and the member are formed from a single sheet of material.

25. A device according to claim 24, where the member comprises at least one section, the member, the at least one section and the at least one portion are formed from a single sheet of material.

26. A device according to claim 1, in which the at least one portion is fixed to the member by means of welding.

27. A device according to claim 1, in which the first and second beams are I-beams, or metal webbed beams.

28. A structural unit comprising at least two side-by-side beams, in which adjacent beams are fixed together with a device according to claim 1.

29. A method of fixing together first and second side-by-side beams, each of the first and second beams having coplanar spaced apart first flanges and coplanar spaced apart second flanges connected by a web, the method comprising:
   positioning a unitary member having a Z-shaped cross-section, first and second opposing ends, and at least one portion extending laterally of each of said ends such that the member extends from a first flange of the first beam to a second flange of the second beam, and configured to transfer a load across the webs of the first and second beams in a shear direction,
   fixing the at least one portion at the first opposing end to an outer surface of the first flange of the first beam, and
   fixing the at least one portion at the second opposing end to an outer surface of the second flange of the second beam.

30. A method according to claim 29 further comprising the steps of
   configuring the member to be of a predetermined load bearing capacity,
   determining the load bearing capacity of a side-by-side beam arrangement, and
   using a plurality of members in accordance with this determination should the load bearing capacity of one device be insufficient.

31. A method according to claim 30, in which the plurality of devices are spaced apart along the side-by-side beam arrangement.

* * * * *

UNITED STATES PATENT AND TRADEMARK OFFICE
CERTIFICATE OF CORRECTION

| | |
|---|---|
| PATENT NO. | : 7,805,910 B2 |
| APPLICATION NO. | : 11/060587 |
| DATED | : October 5, 2010 |
| INVENTOR(S) | : Luke Richard John Whale |

It is certified that error appears in the above-identified patent and that said Letters Patent is hereby corrected as shown below:

Column 1, Line 30: The word "emit" should be removed and replaced with the word "unit".

Column 5, Line 16: The numerical identifier "2" should be removed and replaced with the numerical identifier "72".

Signed and Sealed this
First Day of February, 2011

David J. Kappos
*Director of the United States Patent and Trademark Office*